Oct. 2, 1962 — A. H. ADAMS ET AL — 3,056,418
MIXING FAUCET
Filed May 4, 1959 — 3 Sheets-Sheet 1
FIG. 1.
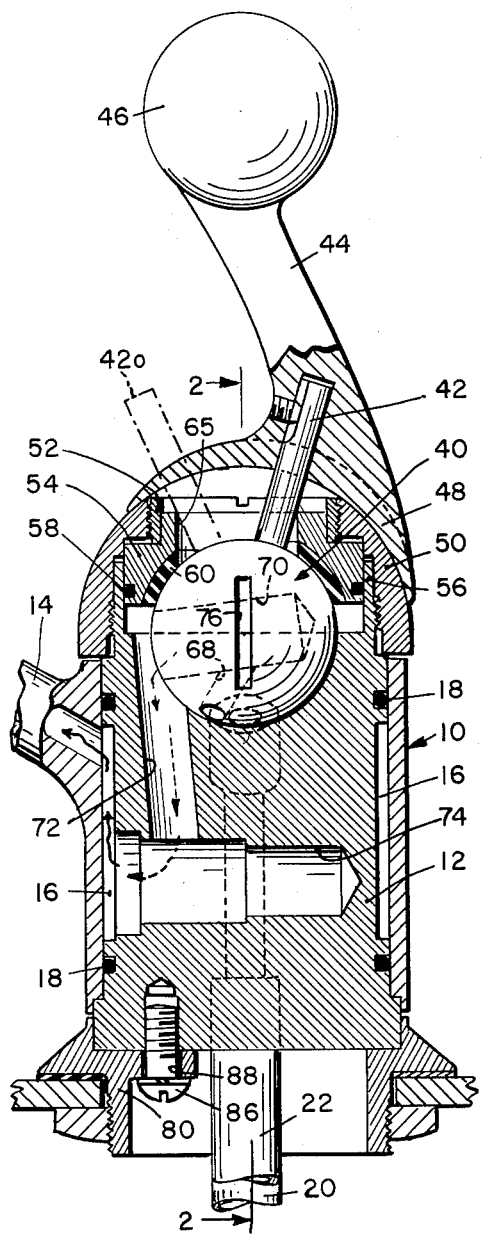
FIG. 3.
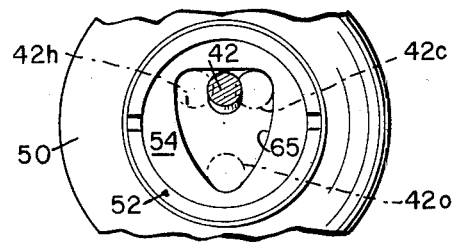
FIG. 2.
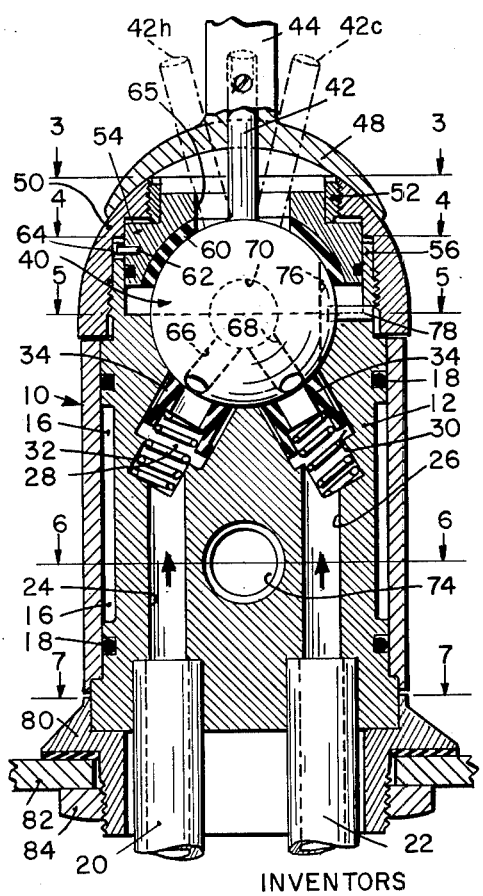
FIG. 8.
INVENTORS
ARTHUR H. ADAMS
LANDIS H. PERRY
BY
ATTORNEY Oct. 2, 1962    A. H. ADAMS ET AL    3,056,418
MIXING FAUCET Filed May 4, 1959    3 Sheets-Sheet 2

INVENTORS
ARTHUR H. ADAMS
LANDIS H. PERRY
BY
*Albert J. Fihe*
ATTORNEY

Oct. 2, 1962    A. H. ADAMS ET AL    3,056,418
MIXING FAUCET
Filed May 4, 1959    3 Sheets-Sheet 3
*Fig. 9*  *Fig. 10*
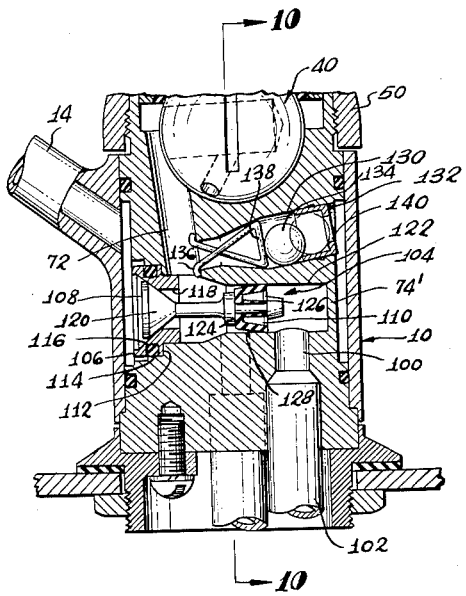
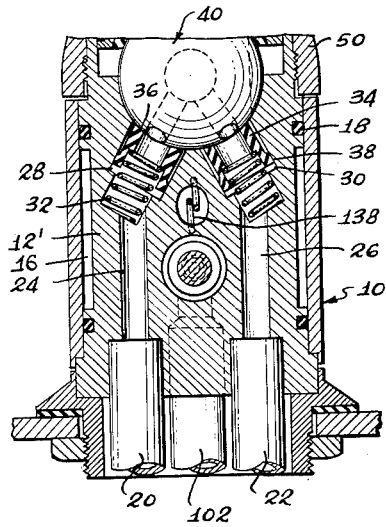
INVENTORS
ARTHUR H. ADAMS
LANDIS H. PERRY
BY Fulwider Mattingly & Huntley
Attorneys

United States Patent Office 3,056,418
Patented Oct. 2, 1962

3,056,418
MIXING FAUCET
Arthur H. Adams, Huntington Park, and Landis H. Perry, Newport Beach, Calif., assignors to James E. Meagher, Altadena, Calif.
Filed May 4, 1959, Ser. No. 810,965
15 Claims. (Cl. 137—119)

The present application is a continuation-in-part of our pending application Serial No. 539,490 filed October 10, 1955, for a Hot and Cold Water Mixing Valve, now abandoned.

The present invention relates generally to valves, and more particularly to an improved valve for mixing or blending a plurality of separate streams of fluid, or for selectively passing but one of the separate fluids, and in either case being movable between full on and full off positions.

In the drawings and in the following description our invention is disclosed as embodied in a hot and cold water mixing faucet. It will be understood, however, that this is by way of illustration rather than limitation and it will be apparent that the invention can readily be adapted for other uses.

An object of our invention is to provide an improved mixing valve having a single, substantially universally movable control member by means of which a plurality of fluids can be selectively mixed or separately passed through the valve.

Another object of the invention is to provide a mixing valve of this type in which an unmixed or a blended fluid can be selectively diverted to one of a plurality of possible outlets.

It is also an object of the invention to provide an improved form of sealing means for valves that utilizes fluid pressure against the sealing element to provide a fluid-tight seal when the valve is in off position, such fluid pressure being substantially relieved when the valve is opened. With this arrangement, the coefficient of sliding friction between the sealing element and a valve part moving thereover is very greatly reduced, thus insuring a very long service life of the sealing element.

Yet another object of the invention is to provide an improved form of sealing element having a novel configuration adapted for the effective utilization of fluid pressure for effecting a fluid-tight seal with a valve part, as well as with a portion of a valve which retains the sealing element.

It is also an object of the invention to provide a valve having optionally selectable fluid outlets in which an anti-syphon means of novel construction is incorporated to very effectively and simply prevent any upstream siphoning of the fluid back through the valve.

The invention also has for an object thereof the provision of a swivel ball valve controllable by a single control member, the ball valve being mounted between opposed sealing elements in such a manner as to assure an effective fluid seal around the ball while at the same time permitting free and accurate positioning and movement of the control member and ball.

Another object of our invention is to provide a valve of the type having alternatively selectable outlets with an automatically actuated diverter means that automatically closes one outlet to divert fluid for delivery through another selected outlet.

These and other objects and advantages of our invention will be apparent from the following description when taken in conjunction with the annexed drawings, in which:

FIGURE 1 is an elevational view of a hot and cold water mixing valve embodying our invention, portions thereof being broken away or sectioned to illustrate interior details of construction;

FIGURE 2 is a vertical sectional view taken on the line 2—2 of FIGURE 1;

Figure 4:
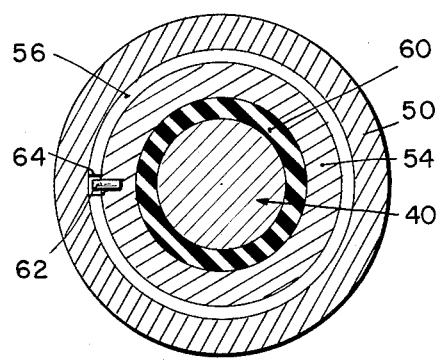
Figure 5:
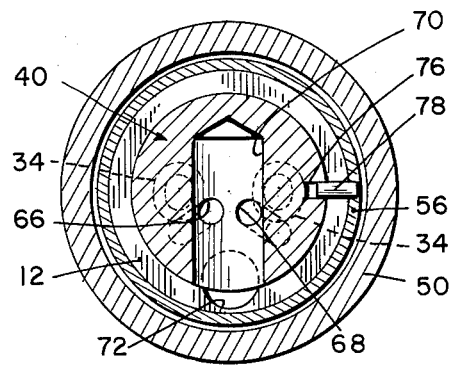
Figure 6:
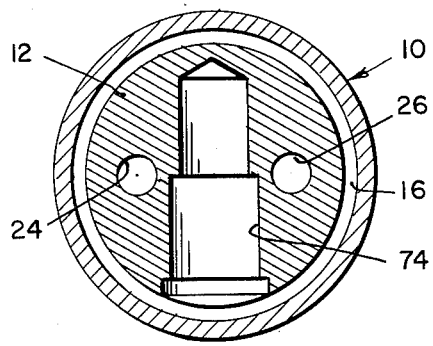
Figure 7:
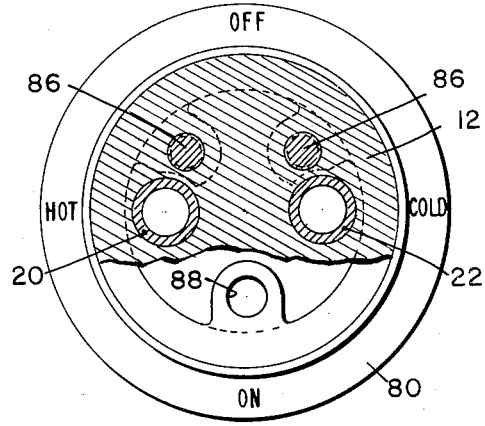
Figure 5A:
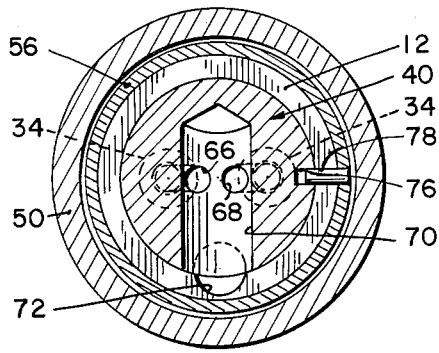

FIGURES 3, 4, and 5 are horizontal sectional views taken on the lines 3—3, 4—4, and 5—5, respectively, of FIGURE 2;

FIGURE 5a is a sectional view similar to FIGURE 5, but showing the relationship of the parts in other relative positions;

FIGURES 6 and 7 are horizontal sectional views taken on the lines 6—6 and 7—7, respectively of FIGURE 2;

FIGURE 8 is an enlarged axial sectional view of one of the sealing elements;

FIGURE 9 is a partial axial sectional view of another form of valve embodying our invention incorporating an anti-syphon means and a diverter means; and FIGURE 10 is a sectional view taken on the line 10—10 of FIGURE 9.

Referring now to the drawings, and in particular to FIGURES 1 and 2, a generally cylindrical outer shell or casing 10 is rotatably mounted on and encloses a body portion 12 of the valve. The body portion 12 is formed with a circumferentially extending groove or cavity 16 of substantial axial length which, in turn, is flanked at its opposite ends by a pair of O-rings 18 mounted in the body portion 12. An annular fluid passage is thus defined between the body portion 12 and the interior of the casing 10 and the casing 10 includes an outwardly extending spout 14 through which water or other fluid can be drawn from this annulus. It will be observed that the spout 14 and casing 10 are rotatable throughout 360 degrees relative to the body portion 12.

In its lower end the body portion 12 is provided with a pair of passages 24 and 26 that extend generally axially through the body and are adapted at their lower ends to receive a cold water inlet pipe 20 and a hot water inlet pipe 22, respectively. At their upper ends the pair of passages 24 and 26 communicate with terminal openings 28 and 30, respectively, which in turn, exit into a semi-spherical recess or ball seat formed at the top of the body 12. It will be noted that the openings 28 and 30 are angularly offset from the passages 24 and 26 and are substantially radially disposed relative to the center of the semi-spherical recess.

A generally tubular seal element 34 is coaxially disposed within each of the passages 28 and 30. These seal elements are formed of rubber or other suitable elastomeric sealing material and each has an upper end 36 molded or otherwise adapted to conform to the exterior surface of a spherical ball valve 40 seated in the upper end of the body 12.

As is shown in FIGURE 8, the axial passage through the sealing element 34 is enlarged at its lower end to provide a seat for the upper end of a spring 32. Referring to FIGURE 2, it will be seen that the lower ends of the passages 28 and 30 are of a reduced diameter adapted to provide seats for the lower ends of the springs 32. The sealing elements 34 have an axial length which is less than that of the enlarged upper ends of the passages 28 and 30 whereby the upper ends 36 of the sealing elements 34 are biased into contact with the ball valve 40 while the lower ends of the sealing elements are spaced apart from the shoulder defined at the junction of the enlarged and reduced diameter portions of the passages 28 and 30.

The arrangement just described is important for insuring a fluid-tight seal between the sealing elements 34 and the ball valve 40, while at the same time eliminating any substantial wear on the upper ends 36 of the sealing elements. When the ball valve 40 is in a completely closed position so that fluid is prevented from escaping through the upper end 36 of the sealing elements 34, the fluid pressure exerted on the area of the lower end faces of the sealing elements 34 insures a fluid-tight seal. The springs 32 serve to maintain the space between the lower ends of the sealing elements 34 and the lower ends of the enlarged diameter portions of the passages 28 and 30 whereby the fluid pressure can be exerted in this fashion. With this arrangement primary reliance need not be placed on the force of the springs 32 to effect a seal.

It will be appreciated that when the ball valve 40 is moved to an open position to permit passage of fluid through the seal elements 34 that a very substantial reduction in fluid pressure occurs within the passages 28 and 30, and particularly a reduction in the axially directed force exerted on the lower end faces of the seal elements 34. The coefficient of friction between the upper ends 36 of the sealing elements and the surface of the ball valve 40 is thereby greatly reduced, but is nevertheless ample to provide a sealing fit therebetween, along with springs 32, so that fluid cannot escape except through the passages provided for this purpose within the ball valve 40. It will also be observed that the upper ends 36 of the sealing elements provide a wiping action across the surface of the ball valve so as to sweep away any particles which might otherwise damage the surface of the ball valve or the upper end 36 of a sealing element. Inasmuch as a reduced pressure is exerted by the sealing elements on the surface of the ball valve during relative movement therebetween, any particles which may be caught therebetween will not have as great a tendency to score either of these surfaces and in all likelihood will eventually be carried out with the fluid passing through the valve.

At its lower end each sealing element 34 is provided with an external circumferentially extending sealing ridge 38, whereby a slight axial displacement of the sealing elements 34 relative to the passages 28 and 30 can take place. This ridge, in conjunction with the enlarged diameter lower end of the axial passage through the sealing element 34, which provides a relatively thin walled section of the element, provides a very effective seal preventing escape of fluid around the ridge 38 into the slight annular space between the sealing element and the passage 28 or passage 30. This is true in both the on and off conditions of the valve, since in either case the relatively thin walled lower end portion of the sealing element 34 more effectively utilizes any pressure therewithin to tightly seat the ridge 38 against the surrounding wall of the passage 28 or 30.

For manipulating the ball valve 40, a stem 42 is affixed in the upper surface of the ball and adapted for reception in a recess formed in the lower end of an operating handle 44, the upper end of which terminates in an operating knob 46. At its lower end the handle 44 is of spherically concave configuration adapted for universal movement over the correspondingly spherical exterior of a cap 50 threadedly mounted on the upper end of the body 12. The lower end of the cap 50 overhangs the upper end of the casing 10 and limits upper axial movement of the casing. The lower end of the casing 10 and a portion of the body 12 are provided with complementary shoulder means limiting downward axial displacement of the casing 10.

The upper end of the body 12 is formed with a cylindrical flange 56 that coaxially encloses a ring 54. This ring is formed with an external upwardly facing shoulder to seat an annulus 52 that is threadedly receivable within the central opening formed in the upper end of the cap 50. To provide a fluid seal between the flange 56 and the lower end of the ring 54 an O-ring 58 is mounted in a complementary groove formed in the ring 54.

The ring 54 is interiorly adapted to seat a sealing washer, gasket, gland or the like 60, which in turn is adapted to bear on the ball valve 40 to provide a fluid seal therebetween. After a long period of use some wear may occur on the gland 60 which can readily be compensated for by appropriate adjustment of the annulus 52, which can be threadedly advanced within the cap 50 to force the ring 54 and gland 60 into intimate contact with the surface of the ball valve 40. The ball valve 40 is thus mounted between the opposed sealing means 60 and seal elements 34, and by proper adjustment of the annulus 52 all of these sealing elements may be retained in effective sealing contact with the ball valve 40 while at the same time allowing easy movement of the control handle 44 and the ball valve.

Referring to FIGURE 3, it will be seen that the ring 54 is formed with a generally triangular or heart-shaped opening 65. This opening serves as a guide within which the pin 42 is universally movable whereby to control the position of the fluid passages through the ball valve 40 relative to the fluid passages in the body 12. In order to maintain the desired angular relationship of the opening 65 relative to the several fluid passages of the valve, a pin 62 or the like protruding outwardly from the ring 54 is adapted for reception within a retaining notch 64 formed in the upper edge of the flange 56 (see FIGURE 4).

The ball 40 is formed with three radially-extending passages 66, 68 and 70 having a common junction in substantially the center of the ball. The passage 70 is preferably equivalent in cross-sectional area to the combined cross-sectional area of the passages 66 and 68 and at its outer end communicates with a generally vertically disposed duct 72 formed in the body 12. A generally horizontally or transversely disposed blind bore or passage 74 receives fluid from the lower end of the duct 72 and in turn communicates at its outer end with the annular space between the body 12 and the sleeve 10 for ultimate transmission of fluid to the spout 14.

As will be apparent, by appropriate manipulation of the handle 44, the pair of passages 66 and 68 can be separately or concurrently disposed in varying degrees of registration with the passages 24 and 26 respectively. Thus, in FIGURE 3, when the pin 42 is in the full line position shown, both passages 66 and 68 are closed. If the handle 42 is then moved directly to the position indicated in phantom outline at 42o, the pair of passages 66 and 68 are concurrently and at the same rate moved into registration with their inlet passages (see FIGURE 5a). When the handle is moved for positioning the pin in the position indicated in dotted outline at 42h and then forwardly, only the passage 66 will be moved into registration with its inlet passage to deliver hot water only. When the handle is moved to position the pin in the dotted outline position at 42c, and then forwardly, cold water at varying rates of flow will be delivered through the valve.

To prevent twisting of the handle 44 about a vertical axis so as to avoid any eccentricity of the passages 66 and 68 other than within the limits imposed by the guide hole 65 a slot 76 is formed in the ball valve 40 that slidably receives a pin 78 affixed in the inner face of the ball valve seat formed in the upper end of the body 12.

For mounting the valve on a sink or other fixture 82, the body 12 at its lower end is mounted in a screw threaded base 80 by means of suitable fasteners 86 adapted to pass through openings 88 formed in the base 80. After the base 80 has been passed through a suitable opening formed in the sink or fixture 82, a retaining ring 84 is threadedly engaged therewith and tightened up to clamp a wall portion of the fixture between the ring and a shoulder of the base 80.

In FIGURES 9 and 10 I have shown a hot and cold water mixing faucet that is adapted to deliver fluid through an auxiliary hose as well as through the spout 14. Faucets of this type are commonly found in kitchens and the added fluid outlet is adapted to deliver hot or cold water to a dish cleaning brush or the like mounted on a hand-held fixture on the end of the auxiliary hose, this fixture being understood to include a shut-off valve. For this purpose, I have provided a means to automatically divert fluid to a selected one of the two possible fluid outlets and in addition have provided an anti-syphon means.

Several parts of the valve shown in FIGURES 9 and 10 are precisely equivalent to corresponding parts of the valve shown in FIGURES 1 through 8. Such parts are identified in FIGURES 9 and 10 by the same numerals and will not be further described.

This valve has a body 12' in which the duct 72 opens at its lower end into a transverse blind bore 74'. Like the bore 74 in the valve body 12, the bore 74' opens into the annular space 16 within the casing 10. Another outlet from the bore 74' is provided by a passage 100 that extends between the blind end of the bore and the bottom of the body 12'. At its lower end the passage 100 is adapted to receive a fitting 102 for passing fluid into a hose or the like, the other end of which is provided with an "on-off" valve control (not shown). In the present instance it will be assumed that this "on-off" control is mounted on a dishwasher attachment so that water can optionally be delivered through the spout 14 or through the dishwasher attachment.

In the operation of this valve, when the ball valve 40 is turned to an "on" position water flowing into the bore 74' is diverted into the spout 14. When the ball valve 40 is in an "on" position along with the dishwasher valve, water from the bore 74' is diverted into the outlet passage 100 for delivery to the dishwasher. This is accomplished by a diverter valve assembly, designated generally by the numeral 104, positioned within the bore 74' that is adapted to automatically divert water to either the spout 14 or the dishwasher.

The assembly 104 includes a valve member 108 that at one end is adapted for seating within a valve seat bushing 106 and that at its other end carries a seal member 110. The bore 74' is enlarged at its outer end and counterbored to provide a seat 112 for an inwardly facing external shoulder formed on the bushing 106. The bushing 106 has a close fit in its counterbore and is adapted to mount an O-ring seal 114 to provide a fluid seal between the bushing and the counterbore.

The bushing 106 is formed with a passage comprising an axially outermost frusto-conical valve seat portion 116 that develops into an axially innermost central bore 118. For opening and closing the bore 118, the valve member 108 at its outermost end has an integrally formed conical section 120 which is complementary to the valve seat 116. As is apparent the range of axial movement of the valve member 108 is limited by the closed position of the section 120, indicated in full outline in FIGURE 9, and the inner surface of the casing 10, which corresponds respectively to closed and open positions of the valve member with respect to the bore 118.

The inner end portion 122 of bore 74' has a diameter greater than the bore 118 in the bushing 116. The seal 110 is coaxially mounted on the inner end of the valve member 108 between a pair of confronting shoulders 124 and 126 formed on the reduced diameter stem of the valve member. This seal is substantially cup-shaped in configuration having a flexible continuous wall 128 that opens towards the blind end of the bore 74'. This wall is conically tapered on its outer surface, increasing in diameter towards the open end thereof to a diameter larger than that of the section 122 of the bore 74' whereby the seal 110 is adapted for peripheral sealing with the bore section 122 for less than the entire axial length of the seal.

In FIGURE 9 the several parts of the valve assembly 104 are shown in the positions which they occupy when both the dishwasher valve and the ball valve 40 are in "off" position. Upon movement of the ball valve 40 only to an "on" position, water passes through the ball valve and the duct 72 into the bore 74' in that portion of its axial length between the valve section 120 and the seal 110. Since the cross-sectional area of the reduced end portion 122 of the bore 74' is greater than the cross-sectional area of the bore 118 in the bushing 106 a greater pressure will be exerted on the portion of the valve assembly 104 contained within the bore section 122 than is exerted on that portion of the valve section 120 exposed within the bore 118, even though the unit pressures are substantially the same. This pressure differential tends to draw the valve member 108 axially inwardly to a more intimate seat of the seal 120 against the seat 116.

Since fluid under pressure is present between the seal 110 and the bore section 122, the seal wall 128 is deformed radially inwardly to permit the passage of fluid into the blind end of the bore 74' thence into the outlet passage 100 and out to the closed dishwasher valve. The pressure of the fluid between the seal 110 and the closed dishwasher valve will then increase and tend to equal the fluid pressure in the portion of the bore 74' between the valve section 120 and the seal 110. The seal 110 is thus subject to axially opposed fluid pressures while the valve section 120 is subject to axially outwardly directed pressures. Thus, when the sum of the axially outwardly directed pressures exceeds the force of the axially inwardly directed pressure on the seal 110, the valve member 108 is thrust outwardly to the extent permitted by casing 10, whereby the bore 118 through the bushing 116 is opened. The fluid is then passed into the annular space 16 for delivery through the spout 14.

It will be apparent from the foregoing description of the operation of this valve that if the dishwasher valve is opened before movement of the ball valve 40 to an open position the ensuing flow will be through the dishwasher valve and not through the spout 14. This will of course occur since no build up of fluid pressure will occur between the dishwasher valve and the seal 110, whereby the valve section 120 will be held against axially outward movement away from the seat 116.

Assuming that the fluid has been diverted for delivery through the spout 14, if it is then desired to divert the fluid for delivery through the dishwasher valve, this change can be accomplished merely by opening the dishwasher valve. Assuming the valve member 108 to be in axially outermost position, it will be apparent that upon opening of the dishwasher valve the axially inwardly directed fluid pressures on the valve assembly will exceed the axially outwardly directed pressures whereby the valve member 108 will be caused to return to the full line position shown in FIGURE 9. It will be seen that fluid passing between the valve section 120 and the seat 116, and through the bore 118, will be at a lower pressure than the pressure fluid within the enlarged end of the bore 74'. Accordingly, the axially inwardly directed force on the seal 110 exceeds the axially outwardly directed force on the valve section 120. Since opening of the dishwasher valve immediately relieves the axially outwardly directed pressure exerted on the inside of the seal 110 the combined axially inwardly directed forces to which the valve member 108 is subjected exceed the axially outwardly directed forces whereby the valve member is thrust into sealing engagement with the valve seat 116. The deformable wall 128 of the seal 110 thereafter yields to permit the diversion of the fluid out through the dishwasher valve.

In valves of this type it is usually necessary to provide an anti-syphon means. In this case we have provided a ball check anti-syphon means that has special utility with the diverter valve means just described.

Referring to FIGURE 9 it will be seen that a bore 130 is formed through he valve body 12' to intercommunicate the duct 72 and the annulus 16. This bore is adapted to receive a cup-shaped ball seat member 132 at its radially outermost end and a ball 134 is contained within the bore 130 between the member 132 and a spring 136, this spring having a pair of crossed legs extending from a web portion 138.

To facilitate insertion of the spring 136 the outer end of the bore 130 has a diameter greater than the length of the spring web 138 while the inner end of the bore tapers to a lesser diameter than the length of the web 138. With this arrangement the spring 136 can be pushed into the bore 130, the crossed legs thereof yielding to extend outwardly into the duct 72. The extremities of the spring legs are bent to provide hooks engageable with the surrounding wall portion of the duct 72 to prevent movement of the spring outwardly in the bore 130. These hooked portions snap into place at substantially the same time that the web 138 becomes wedgingly engaged with the tapered end of the bore 130. The ball 134 is thus loosely continued within the bore 130 for free movement between the limits imposed by the spring web 138 and a ball seat 140 formed in the seat member 132.

When the ball valve 40 is turned to an "on" position, whether singly or in combination with the dishwasher valve, the pressure of fluid communicated to the ball 134 from the duct 72 will exceed the pressure of fluid on the ball 134 from the downstream fluid within the annulus 16. Accordingly, the ball 134 will be moved into the dotted line position indicated in FIGURE 9 to close the seat 140.

In the event of an accident such as would cause upstream syphoning through the valve the anti-syphon means just described will prevent syphoning action in the following manner. For example, suppose the following conditions exist simultaneously, i.e. a leak upstream of either of the sealing elements 34, leakage or an open condition between the seal elements 34 and the ball valve 40, leakage through the seal 110 and a leak in a portion of the fluid conducting means between the seal 110 and the dishwasher valve, or an open condition of the dishwasher valve, the last leak or valve being assumed to communicate with fluid which it is desired to keep from syphoning back through the ball valve 40 into the water supply system. Under these conditions the pressure fluid in the system between the seal 110 and the dishwasher valve will be at a greater pressure than the fluid between the seal 110 and the leak in the water supply system. The fluid will thus tend to migrate upstream being syphoned into the bore 74', duct 72, through the ball valve 40 into one or the other or both of the passages 24 and 26, and thence upstream to the leak in the water supply system. This result is prevented by the action of the anti-syphon means just described.

It will be observed that the bore 130 containing the ball 134 is inclined from the horizontal so that the ball 134 is normally unseated. The seat 140 is thus open and in fluid communication with the annulus 16 and spout 14, the spout 14 being opened to the atmosphere at its free end. Therefore, in the event of syphoning upwardly through the duct 72 air is passed into the spout 14 through the annulus 16 into the bore 130, around the ball 134 and into the duct 72. The syphoning effect of the leak in the water supply system is thus destroyed and if not destroyed will result in nothing more dangerous than air being temporarily syphoned into the water supply system. In this connection it will be noted that the spring 136 prevents the ball 134 advancing so far into the bore 130 as to close the bore. It will also be observed that due to the cup-shaped configuration of the seal 110 if the seal remains intact syphoning cannot occur since the wall 128 of the seal will be pressed into intimate fluid sealing engagement with the bore section 122, thereby preventing any syphoning therethrough.

While the particular apparatus herein shown and described in detail is fully capable of attaining the objects and providing the advantages hereinbefore stated, it is to be understood that this apparatus is merely illustrative of our invention and we do not mean to be limited to the details of construction or design herein shown except as limited by the spirit and scope of the following claims.

We claim:

1. In a valve having a pair of possible outlets only one of which is controlled by another valve the combination comprising: a valve body having a substantially vertically extending outlet duct and a pair of substantially vertically extending inlet passages formed therein, said duct and passages opening at their upper ends in a ball seat formed in said body; a ball valve on said seat and formed with passageways intercommunicate said duct and inlet passages when said passageways are moved into registration with said passages in response to movement of said ball valve; a generally tubular sealing element in the downstream ends of said inlet passages having a fluid conducting opening therethrough, said element having an upstream end face exposed to fluid pressures within said inlet passage to force a downstream end face of said element into fluid-sealing engagement with the surface of said ball valve to prevent fluid communication between said passages and passageways only when they are out of registration, said elements at their upstream end having fluid-sealing engagement with said inlet passages; a bore formed in said body spaced from said seat, traverse with respect to and in fluid communication with the lower end of said duct, opposite ends of said bore having fluid communication with different ones of said pair of possible outlets; and a diverter valve means in said bore to close said bore simultaneously to both said possible outlets when said ball valve is in an off position, and to pass fluid through the controlled one of said possible outlets when said controlled outlet is opened by said other valve and said ball valve is moved to an on position, and to pass fluid through the uncontrolled one of said outlets when said controlled outlet is closed and said ball valve is in an on position.

2. In a valve having a pair of possible outlets only one of which is controlled by another valve the combination comprising: a valve body having a substantially vertically extending outlet duct and a pair of substantially vertically extending inlet passages formed therein, said duct and passages opening at their upper ends in a ball seat formed in said body; a ball valve on said seat and formed with passageways to intercommunicate said duct and inlet passages when said passageways are moved into registration with said passages in response to movement of said ball valve; a generally tubular sealing element in said inlet passages having a fluid conducting opening therethrough, said element having an upstream end face exposed to fluid pressures within said inlet passage to force a downstream end face of said element into fluid-sealing engagement with the surface of said ball valve to prevent fluid communication between said passages and passageways only when they are out of registration, said elements at their upstream end having fluid-sealing engagement with said inlet passage; a bore formed in said body spaced from said seat, traverse with respect to and in fluid communication with the lower end of said duct, opposite ends of said bore being disposed on opposite sides of said duct and having fluid communication with different ones of said pair of possible outlets; and a diverter valve assembly in said bore including an axially movable member having a valve section on one end for sealing engagement with an end of said bore to close said bore to the uncontrolled one of said outlets, said member mounting a check valve means at the other end for closing said bore to the controlled one of said outlets, said ends of said member being disposed on opposite sides of said duct to be exposed to substantially the same unit pressures of fluid within said bore when said ball valve is in an on position, said check valve means having a greater area exposed to said fluid pressure than said valve section whereby said member is biased into a closed position of said valve section to divert fluid from said bore to said controlled outlet, said check valve means yielding to said fluid pressure to pass fluid through said controlled outlet when said controlled outlet is open and to equalize pressures on opposite sides of said check valve means when said controlled outlet is closed, said equalized pressure permitting opening of said bore to said uncontrolled opening in response to fluid pressure exerted on said valve section of said member.

3. In a valve having a pair of possible outlets only one of which is controlled by another valve the combination comprising: a valve body having a substantially vertically extending outlet duct and a pair of substantially vertically extending inlet passages formed therein, said duct and passages opening at their upper ends in a ball seat formed in said body; a ball valve on said seat and formed with passageways to intercommunicate said duct and inlet passages when said passageways are moved into registration with said passages in response to movement of said ball valve; a generally tubular sealing element in said inlet passages having a fluid conducting opening therethrough, said element having an upstream end face exposed to fluid pressures within said inlet passage to force a downstream end face of said element into fluid-sealing engagement with the surface of said ball valve to prevent fluid communication between said passages and passageways only when they are out of registration, said elements at their upstream end having fluid-sealing engagement with said inlet passage; a bore formed in said body spaced from said seat, traverse with respect to and in fluid communication with the lower end of said duct, opposite ends of said bore having fluid communication with different ones of said pair of possible outlets; and a diverter valve assembly in said bore which includes a reciprocable valve member enlarged at one end for sealing an end of said bore to the uncontrolled one of said outlets and carrying a deformable seal on the other end thereof for unidirectionally sealing said bore to the controlled one of said outlets, said ends of said member being disposed on opposite sides of said duct to be exposed to substantially the same unit pressures of fluid within said bore, said enlarged end and said seal having confronting surfaces of different areas subject to fluid pressure therebetween to bias said member into position for closing said bore to said uncontrolled outlet when said controlled outlet is opened and to move said member into position for opening said bore to said uncontrolled outlet when fluid pressures on opposite sides of said seal approach equality.

4. A valve as set forth in claim 3 in which said seal comprises a substantially cup-shaped seal having a flexible continuous wall opening downstream towards said controlled outlet, the outer surface of said wall being frusto-conical in configuration with an enlarged diameter open end in yieldable sealing engagement with said bore, said wall being deformable radially inwardly to unidirectionally pass pressure fluid downstream towards said controlled outlet.

5. In a valve having a pair of possible outlets only one of which is controlled by another valve the combination comprising: a valve body having an outlet duct and a pair of inlet passages formed therein, said duct and passages opening at one end in a ball seat formed in said body; a ball valve on said seat and formed with passageways to intercommunicate said duct and inlet passages when said passageways are moved into registration with said passages in response to movement of said ball valve; a generally tubular sealing element in said inlet passages having a fluid conducting opening therethrough, said element having an upstream end face exposed to fluid pressures within said inlet passage to force a downstream end face of said element into fluid-sealing engagement with the surface of said ball valve to prevent fluid communication between said passages and passageways only when they are out of registration, said elements at their upstream end having fluid-sealing engagement with said inlet passage; a bore formed in said body in fluid communication with a downstream end of said duct, opposite ends of said bore having fluid communication with different ones of said pair of possible outlets; and a diverter valve assembly in said bore which includes a reciprocable valve member enlarged at one end for sealing an end of said bore to the uncontrolled one of said outlets and carrying a check valve means on the other end thereof for unidirectionally sealing said bore to the controlled one of said outlets, said ends of said member being disposed on opposite sides of said duct to be exposed to substantially the same unit pressures of fluid within said bore, said ends of said member having confronting surfaces of different areas subject to fluid pressure therebetween to bias said member into position for closing said bore to said uncontrolled outlet when said controlled outlet is opened and to move said member into position for opening said bore to said uncontrolled outlet when fluid pressures on opposite sides of said check valve means approach equality; and an anti-syphon means in said body including a syphon passage intercommunicating said duct and said uncontrolled outlet in which a check valve is disposed to close only when fluid is diverted to one of said outlets.

6. A device as set forth in claim 5 in which said anti-syphon means includes a ball check freely movable in said passage, said passage at an uppermost end having a seat complementary to said ball whereby said ball is gravitationally held out of sealing contact with said seat.

7. In a faucet having first and second outlets, a valve body having a substantially vertically extending outlet duct and a pair of substantially vertically extending inlet passages formed therein, said duct and passages opening at their upper ends in a seat formed in said body, a valve swiveled on said seat and formed with passageways to interconnect said duct and inlet passages when said passageways are moved into registration with said passages in response to movement of said valve, an annular sealing element of resilient material in the downstream end of each of said inlet passages having a fluid conducting opening and a downstream end face biased into fluid sealing engagement with the outer surface of said valve to prevent fluid communication between said pasages and passageways when they are out of registration, a bore in said body spaced from said seat, traverse with respect to and in fluid communication with the lower end of said duct, one end of said bore having fluid communication with one of said outlets and the other end of said bore having fluid communication with the other of said outlets, and a diverter valve means in said bore operable to close said bore to both of said outlets when said valve is in an off position, said diverter valve means being operable in response to back pressure in said other of said outlets to pass fluid through said one end of said bore to said one of said outlets when said valve is in an open position, and upon elimination of said back pressure to pass fluid through the other end of said bore to the other of said outlets.

8. A faucet according to claim 7 including an anti-syphon means having a passage interconnecting said duct and said one of said outlets, and a normally open check valve in said passage arranged to be closed by fluid which flows into said passage from said duct when said valve is open.

9. In a valve a body having a hemispherical seat and a pair of spaced inlet ports therein, a complementary ball valve swiveled on said seat and formed with communicating passages terminating in spaced ports in the periphery of said ball valve, a cap secured to said body and spaced from said ball valve, an annular elastic sealing ring confined between and separating said cap and the spherical surface of said ball valve whereby said ball valve is sealed to said cap and swiveled under pressure on said seat, each of said ports in the periphery of said ball valve being disposed for fluid communicating registration with a respective one of said inlet ports in said seat and said ball valve being swiveled so that both of said ports therein can concurrently or selectively be brought into fluid communicating registration with their respective inlet port in said seat, a rubber-like annular flexible sealing element within each inlet port in said seat in fluid sealing engagement with the walls thereof, the upstream end of each of said elements being exposed to fluid pressure within its respective inlet port so as to force the downstream end of said element into fluid sealing engagement with the outer surface of said ball valve, said body having an outlet port spaced from the space between said inlet ports and positioned so that it is in communication with said passages in the ball valve at their ends opposite the ports thereof in all positions of said ball valve, said inlet ports being oppositely disposed with respect to said sealing ring whereby the thrust of said valve member due to the pressure of fluids in the inlet ports is taken by said elastic sealing ring in all positions of said ball valve, and a handle connected to said ball valve and projecting through said sealing ring and an opening in said cap whereby said ball valve may be swiveled in said hemispherical seat.

10. A valve according to claim 9 wherein said ball valve is provided with a slot in the periphery thereof and said body is provided with a pin which projects into said slot for controlling the swiveling of said ball valve with respect to said seat whereby said ball may be swiveled so as to selectively control and vary the flow of fluids from said inlet ports through the passages in said ball valve and the mixture of such fluids while preventing cross flow of fluids between said inlet ports in the closed portion of said ball valve, said pin and slot being disposed and arranged so that said ball valve can be assembled in only one way in said seat.

11. In a valve body having a hemispherical seat and a pair of spaced inlet ports therein, a complementary ball valve swiveled on said seat and formed with communicating passages terminating in spaced ports in the periphery of said ball valve, a cap secured to said body and having a spherical surface spaced from and facing said ball valve, an annular elastic sealing ring confined between and separating the spherical surfaces of said cap and said ball valve whereby said ball valve is swiveled under pressure on said seat, each of said ports in the periphery of said ball valve being disposed for fluid communicating registration with a respective one of said inlet ports in said seat and said ball valve being swiveled so that both of said ports therein can concurrently or selectively be brought into fluid communicating registration with their respective inlet port in said seat, a rubber-like annular flexible sealing element within each inlet port in said seat in fluid sealing engagement with the walls thereof and biased into fluid sealing engagement with the outer surface of said ball valve, said body having an outlet port spaced from the space between said inlet ports and positioned so that it is in communication with said passages in the ball valve at their ends opposite the ports thereof in all positions of said ball valve, said inlet ports being oppositely disposed with respect to said sealing ring whereby the thrust on said valve member due to the pressure of fluids in the inlet ports is taken by said elastic sealing ring in all positions of said ball valve, a handle connected to said ball valve and projecting through said sealing ring and an opening in said cap whereby said ball valve may be swiveled in said hemispherical seat so as to selectively control and vary the flow of fluids from said inlet ports through the passages in said ball valve and the mixture of said fluids while preventing cross flow of fluids between said inlet ports in the closed position of said ball valve.

12. A mixing valve comprising a body having a hemispherical recess forming a seat, a pair of spaced fluid inlet ports in said seat, and an outlet port in said seat spaced from said inlet ports and offset to one side thereof, a spherical valve member seated in said recess having two internal angularly related passages and an outlet port with one end of each of said two passages communicating with said outlet port, the other ends of said passages being spaced from each other and terminating at the outer surface of said valve member, the outer end of one of said two passages in said valve member being arranged to register with one of said inlet ports and the outer end of the other of said two inlet passages being arranged to register with the other of said inlet ports, and said outlet port in said valve member being arranged to communicate with said outlet port in said recess in all positions of said spherical valve member, an annular sealing member of resilient material within each of said inlet ports in said body adjacent said spherical recess and having a sealing face biased into sealing contact with the outer surface of said spherical valve member, a cap secured to said body and providing a concave spherical surface spaced from and facing said spherical valve member, an annular elastic sealing ring confined between and separating the spherical surfaces of said cap and said spherical valve member whereby said valve member is swiveled under pressure in said seat between said sealing ring and said sealing faces of said sealing member, said spherical valve member having a handle projecting through an opening in said cap whereby said spherical valve member may be swiveled in said seat, the outer ends of said passages and said port in said valve member and said ports in said seat being arranged so that movement of said valve member by said handle about a first axis of said valve member varies the rate at which fluid is delivered from either or both of said inlet ports to said outlet port and movement of said valve member by said handle about another axis of said valve member transverse to said first axis varies the ratio of the two inlet fluids appearing in the outlet port, and means to prevent rotation of said valve member about an axis normal to said axes, said inlet ports being symmetrically arranged with respect to said last-mentioned axis and said spherical sealing ring whereby the thrust on said valve member due to pressure of fluids in the inlet ports is taken by said sealing ring.

13. A mixing valve comprising a body having a hemispherical recess forming a seat, a pair of spaced inlet ports in said spherical seat, an outlet port in said seat spaced from said inlet ports and offset to one side of the space between said ports, a spherical valve member swiveled in said recess and having two internal angularly related passages and an outlet port with one end of each of said two passages communicating with said outlet port, the other ends of said passages being spaced from each other and terminating at the outer surface of said valve member, the outer end of one of said two passages in said valve member being arranged to communicate with one of said inlet ports and the outer end of the other of said two passages being arranged to communicate with the other of said inlet ports and said outlet port in said valve member being arranged to communicate with said outlet port in said recess in all positions of said spherical valve member, an annular sealing member of resilient material within each of said inlet ports in said body adjacent said spherical recess and having an annular resilient sealing face biased into sealing contact with the outer surface of said spherical valve member, each of said sealing members having sealing engagement with its respective inlet port and being constructed and arranged so that the hydraulic pressure of the fluid to which it is exposed in said inlet port holds said sealing face of said sealing member in sealing contact with the outer surface of said spherical valve member, a cap secured to said body and providing a concave spherical surface spaced from and facing said spherical valve member, an elastic spherical sealing ring confined between and separating the spherical surfaces of said cap and said spherical valve member whereby said valve member is swiveled under pressure between said sealing ring and said sealing faces of said sealing members, a handle connected to said spherical valve member and projecting through said cap whereby said spherical valve member may be moved angularly with respect to said body, the outer ends of said passages and port in said valve member and said ports in said recess in said body being arranged so that movement of said valve member by said handle about a first axis of said valve member varies the rate at which fluid is delivered from either or both of said inlet ports to said outlet port and movement of said valve member by said handle about an axis of said valve member transverse to said first axis varies the ratio of the two inlet fluids appearing in the outlet port and so that cross flow of fluids between said inlet ports is prevented in the closed position of said spherical valve member, and means to prevent rotation of said valve member about an axis normal to said axes, said inlet ports being symmetrically arranged with respect to said last-mentioned axis and said spherical sealing ring whereby the thrust on said valve member due to pressure of fluids in the inlet ports is taken by said sealing ring and substantially uniformly distributed over the annular area thereof.

14. In a valve the combination comprising a valve body having a hemispherical seat and at least one inlet passage formed therein, said passage having a downstream end that opens into said seat, a complementary ball valve swiveled on said seat and formed with an outlet passage, said passages being movable into and out of fluid communicating registration when said ball valve is moved on said seat, a generally tubular sealing element of resilient material mounted in said downstream end of said inlet passage and having a fluid conducting opening therethrough, said element having an upstream end face exposed to fluid pressure within said inlet passage to force a downstream end face of said element into fluid sealing engagement with the surface of said ball valve to prevent fluid communication between said passages when said passages are out of registration, said element being of generally cylindrical configuration and mounted substantially coaxially in said inlet passage, said element at its upstream end being formed with a circumferential ridge in sealing engagement with the wall of said inlet passage, the axially upstream end of said element having a wall thinner than the downstream end of said element to transmit fluid pressure within said element to said ridge.

15. In a mixing valve the combination comprising: a body having a generally spherical recess at one end thereof, said body being generally cylindrical along at least a portion of its length; a sleeve having an outlet port integral therewith, said sleeve being aligned with at least a portion of said cylindrical length of said body and spaced therefrom; means holding said sleeve on said body and including means forming a fluid seal between said body and said sleeve, whereby the only outlet for fluid in the space between said sleeve and body is through said outlet port; a pair of inlet passageways extending through said body and terminating in spaced apertures at said spherical recess; an outlet passageway extending through said body from said spherical recess to said space between said sleeve and said body; a spherical valve body mounted in said spherical recess and having passageways to interconnect said inlet passageways and said outlet passageway; an annular sealing member of a resilient material in each of said inlet passageways adjacent said spherical recess and whose outer face is generally spherical to conform to the surface of said valve body, said sealing members being generally in the shape of a hollow cylinder substantially coaxial with the inlet passageway but generally smaller in diameter than said passageway, each of said sealing members having an annular bead on the end of said cylinder remote from said valve body, said annular bead making a sealing fit with its inlet passageway, whereby said sealing member may tip with respect to its passageway; resilient means urging said sealing members against said valve body; a handle connected to said valve body to move said valve body angularly with respect to said body member, said passageways and said valve body being so arranged that movement of said handle in one direction about a first axis varies the rate at which fluid is delivered to said outlet port, and movement of said handle about an axis perpendicular to said first axis varies the ratio of the two inlet fluids appearing in the outlet fluid; and packing means urging said valve body against said spherical seat to produce a sealing fit therebetween, said packing means being generally annular with connection between said handle and said valve body passing through a central opening therein.

References Cited in the file of this patent
UNITED STATES PATENTS

| | | |
|---|---|---|
| 944,598 | Caskey | Dec. 28, 1909 |
| 1,677,242 | Larrigan | July 17, 1928 |
| 2,172,345 | Bucknell | Sept. 12, 1939 |
| 2,535,580 | Kersten | Dec. 26, 1950 |
| 2,592,062 | Perry | Apr. 8, 1952 |
| 2,871,880 | Leuthesser | Feb. 3, 1959 |
| 2,911,009 | Parker | Nov. 3, 1959 |
| 2,919,886 | Hurst | Jan. 5, 1960 |
| 2,949,933 | Moen | Aug. 23, 1960 |
| 2,973,001 | McAuley | Feb. 28, 1961 |

UNITED STATES PATENT OFFICE
CERTIFICATE OF CORRECTION

Patent No. 3,056,418            October 2, 1962

Arthur H. Adams et al.

It is hereby certified that error appears in the above numbered patent requiring correction and that the said Letters Patent should read as corrected below.

Column 8, line 6, after "passageways" insert -- to --; column 8, line 52, column 9, line 24, and column 10, line 39, for "traverse", each occurrence, read -- transverse --.

Signed and sealed this 26th day of February 1963.

(SEAL)
Attest:

ESTON G. JOHNSON            DAVID L. LADD

Attesting Officer            Commissioner of Patents